United States Patent [19]

Koga et al.

[11] Patent Number: 5,614,593
[45] Date of Patent: Mar. 25, 1997

[54] PREPARATION OF MATTE VINYL CHLORIDE POLYMER AND COMPOSITION THEREOF

[75] Inventors: Toshimichi Koga; Minoru Shigemitsu; Osamu Matsumoto; Makoto Suzuki, all of Ibaraki-ken, Japan

[73] Assignee: Shin-Etsu Chemical Co., Ltd., Tokyo, Japan

[21] Appl. No.: 556,425

[22] Filed: Nov. 9, 1995

[30] Foreign Application Priority Data

Nov. 14, 1994 [JP] Japan .................................. 6-304281

[51] Int. Cl.$^6$ .............................. C08F 2/20; C08F 214/06
[52] U.S. Cl. ...................... 525/306; 526/344; 526/344.2
[58] Field of Search ............................... 526/344.2, 344; 525/306

[56] References Cited

U.S. PATENT DOCUMENTS

| | | | |
|---|---|---|---|
| 4,299,941 | 11/1981 | Narisawa | 526/273 |
| 4,816,539 | 3/1989 | Wanatabe | 526/320 |
| 5,376,747 | 12/1994 | Shigemitsu | 526/202 |
| 5,448,004 | 9/1995 | Amano | 526/202 |

*Primary Examiner*—Irina S. Zemel
*Attorney, Agent, or Firm*—McAulay Fisher Nissen Goldberg & Kiel, LLP

[57] ABSTRACT

In preparing a matte vinyl chloride polymer by suspension polymerizing a monomeric charge comprising monomeric vinyl chloride in an aqueous medium, polymerization is started in the presence of 0.05–0.25 part by weight of diallyl phthalate per 100 parts by weight of the monomeric charge, and polymerization is continued while adding 0.01–0.15 part by weight of 1,6-hexanediol di(meth)acrylate per 100 parts by weight of the monomeric charge when the rate of polymerization is in the range of 20–60%. There is produced a matte vinyl chloride-diallyl phthalate copolymer having a tetrahydrofuran-insoluble gel content of 0.5–2.5% by weight in a reproducible manner. A composition prepared by blending the copolymer with a plasticizer has minimized fish-eyes and improved matting effect.

4 Claims, No Drawings

PREPARATION OF MATTE VINYL CHLORIDE POLYMER AND COMPOSITION THEREOF

BACKGROUND OF THE INVENTION

1. Field of the Invention

This invention relates to a process for preparing a matte vinyl chloride resin useful as high quality matte molding material owing to minimized fish-eyes and good workability and a process for preparing a matte vinyl chloride polymer composition.

2. Prior Art

In general, plasticized vinyl chloride resins are widely used as wire coatings, hoses, tubes, packings, gaskets, leather sheets and household goods. There is an increasing demand for matte products and in this regard, many conventional vinyl chloride resin products fail to fully satisfy users' demand.

Since vinyl chloride resins are improved in physical properties such as mechanical strength and compression set as their degree of polymerization increases, an appropriate degree of polymerization is selected in accordance with the set of physical properties required in a particular application. Despite such improvement in physical properties, vinyl chloride resins having a higher degree of polymerization are undesirably low in workability.

On the other hand, vinyl chloride-diallyl phthalate copolymers, which are abbreviated as VC-DAP copolymers, hereinafter, are known to be easily workable, have superior physical properties such as mechanical strength, compression set and heat resistance as compared with vinyl chloride copolymers having an identical degree of polymerization, and afford a matte finish outer appearance to molded products.

For example, Japanese Patent Publication (JP-B) No. 27774/1984 discloses a vinyl chloride resin composition comprising 100 parts by weight of a vinyl chloride resin in the form of a VC-DAP suspension copolymer which is fully soluble in tetrahydrofuran (THF) and has an average degree of polymerization of at least 2,000 and 65 to 200 parts by weight of a plasticizer. This vinyl chloride resin composition comprising a plasticized vinyl chloride polymer (VC-DAP copolymer) has the advantage of minimized fish-eyes, but suffers from the problem that when extrusion molded at high temperatures, molded parts have a less matte outer appearance and when molded at low temperatures, the gelling time is long though shorter than vinyl chloride homopolymers.

Japanese Patent Application Kokai (JP-A) No. 117550/1979 discloses a vinyl chloride resin composition comprising 100 parts by weight of a VC-DAP copolymer consisting of 1 to 90% by weight of a THF insoluble gel component and the remainder of a THF soluble component and 25 to 200 parts by weight of a plasticizer. This vinyl chloride resin composition comprising a plasticized VC-DAP copolymer has the problem that when the THF insoluble gel component of the VC-DAP copolymer exceeds 2.5% by weight, molded parts have a fully matte outer appearance, but contain many fish-eyes, and the matte finish of molded parts is rather rough in texture, so that the outer appearance is less attractive. When the THF insoluble gel component of the VC-DAP copolymer is less than 2.5% by weight, molded parts of the vinyl chloride resin composition are satisfactory in that less fish-eyes are contained, the matte finish of molded parts is fine in texture, and the outer appearance gives a satisfactory matte finish. Regrettably, it is difficult to prepare in a reproducible manner a VC-DAP copolymer containing such a limited amount of gel as less than 2.5% by weight of the THF insoluble gel component.

More particularly, when it is desired to prepare a VC-DAP copolymer containing such a limited amount of gel as less than 2.5% by weight of the THF insoluble gel component, the polymerization temperature and the amount of diallyl phthalate added must be carefully controlled. These conditions are in the critical region where the THF insoluble gel component forms. During polymerization under identical conditions, depending on a subtle change of polymerization conditions, the THF insoluble gel component will form in a large amount in some cases, but no gel component will form in other cases. On this account, it is difficult to prepare in a reproducible manner a VC-DAP copolymer containing such a limited amount of gel as less than 2.5% by weight of the THF insoluble gel component.

As the area of application of matte vinyl chloride polymers and compositions thereof is expanded, a severer demand is imposed on the quality of such polymers and compositions. It is desired to minimize fish-eyes especially for film and sheet form applications, and it is desired to have molded parts of quality offering a matte outer appearance whose matte finish is fine in texture and uniform.

SUMMARY OF THE INVENTION

Therefore, an object of the present invention is to provide a process for preparing in a reproducible manner a vinyl chloride resin, especially a VC-DAP copolymer containing a limited amount of a THF insoluble gel component and having advantages of minimized fish-eyes and fine texture uniform matting effect Another object of the invention is to provide a process of preparing a composition utilizing the resulting vinyl chloride resin.

Recognizing the fact that a VC-DAP copolymer containing a limited amount of a THF insoluble gel component and a composition comprising the same have less fish-eyes and when extrusion molded at high temperatures, provide molded parts having a matte outer appearance whose matte finish is fine in texture and uniform, we have striven to develop a process for preparing a VC-DAP copolymer containing a limited amount of a THF insoluble gel component in a reproducible manner. Regarding the process of suspension polymerizing a monomeric charge consisting of a vinyl chloride monomer or a vinyl chloride monomer and another polymerizable monomer in an aqueous medium, we have found that if polymerization is started after adding 0.05 to 0.25 part by weight of diallyl phthalate (DAP) to 100 parts by weight of the monomeric charge, and if polymerization is continued while adding a crosslinking agent, more specifically 0.01 to 0.15 part by weight of 1,6-hexanediol diacrylate or dimethacrylate to 100 parts by weight of the monomeric charge when the rate of polymerization is in the range of 20 to 60%, then a VC-DAP copolymer containing a limited amount, specifically 0.5 to 2.5% by weight of a THF-insoluble gel component can be prepared in a reproducible manner. We have also found that a VC-DAP copolymer composition comprising the thus obtained VC-DAP copolymer has minimal fish-eyes and when extrusion molded at high temperatures, provide molded parts having a matte outer appearance whose matte finish is fine in texture and uniform, and is effectively workable.

Accordingly, the present invention provides a process for preparing a matte vinyl chloride polymer by suspension polymerizing a monomeric charge comprising monomeric vinyl chloride in an aqueous medium, comprising the steps of starting polymerization in the presence of diallyl phthalate in an amount of 0.05 to 0.25 part by weight per 100 parts by weight of the monomeric charge, and continuing polymerization while adding 1,6-hexanediol diacrylate or 1,6-hexanediol dimethacrylate in an amount of 0.01 to 0.15 part by weight per 100 parts by weight of the monomeric charge when the rate of polymerization is in the range of 20 to 60%, thereby forming a matte vinyl chloride polymer having a tetrahydrofuran-insoluble gel content of 0.5 to 2.5% by weight.

Also contemplated herein is a process for preparing a flexible matte vinyl chloride polymer composition comprising the step of mixing 100 parts by weight of the matte vinyl chloride polymer obtained by the process of claim 1 with 50 to 150 parts by weight of a plasticizer.

BEST MODE FOR CARRYING OUT THE INVENTION

According to the present invention, a matte vinyl chloride polymer is prepared by effecting suspension polymerization of a monomeric charge containing vinyl chloride in an aqueous medium in a reactor. It is understood that the monomeric charge consists of a vinyl chloride monomer or is a mixture of the majority of a vinyl chloride monomer and at least one vinyl monomer. According to a first aspect of the present invention, polymerization is started in the presence of (A) diallyl phthalate, and when the rate of polymerization reaches 20 to 60%, (B) 1,6-hexanediol di(meth)acrylate is added to continue suspension polymerization.

The amount of component (A) or diallyl phthalate (DAP) used is 0.05 to 0.25 part by weight, preferably 0.1 to 0.2 part by weight per 100 parts by weight of the monomeric charge. Less than 0.05 part of diallyl phthalate added is ineffective for improving the workability of a VC-DAP copolymer and the matting effect of molding appearance whereas more than 0.25 part of diallyl phthalate causes a THF-insoluble gel component to form in a larger amount, resulting in more fish-eyes and molded parts having increased compression set.

Component (B) used herein is 1,6-hexanediol diacrylate or 1,6-hexanediol dimethacrylate alone or in admixture. In preparing a VC-DAP copolymer having a THF-insoluble gel content of 0.5 to 2.5% by weight in a reproducible manner, 1,6-hexanediol di(meth)acrylate is selected as the crosslinking component (B) because 1,6-hexanediol di(meth)acrylate makes it easy to adjust the gel content as compared with other polyfunctional monomers having at least two ethylenic double bonds in a molecule. If polyfunctional monomers having at least two ethylenic double bonds in a molecule other than 1,6-hexanediol di(meth)acrylate are used as component (B), the formation of a THF-insoluble gel component can be extremely inconsistent when they are added in an equivalent amount and the amount of a THF-insoluble gel component formed can largely vary with a little change of the addition amount. Adjustment of a gel component is difficult in any case.

The amount of (B) 1,6-hexanediol di(meth)acrylate used is 0.01 to 0.15 part by weight, preferably 0.03 to 0.1 part by weight per 100 parts by weight of the monomeric charge. Outside this range, it is difficult to prepare a VC-DAP copolymer having a THF-insoluble gel content of 0.5 to 2.5% by weight in a reproducible manner. More particularly, with ess than 0.01 part of component (B), the gel component is formed little, failing to improve workability and the matting effect on molded part appearance. With more than 0.15 part of component (B), the gel component is formed much, resulting in increased fish-eyes and molded parts with increased compression set.

Component (B) is added when the rate of polymerization reaches 20 to 60%, preferably 30 to 50%. If component (B) is added at stages other than this period, it is difficult to prepare a VC-DAP copolymer having a THF-insoluble gel content or 0.5 to 2.5% by weight in a reproducible manner. More particularly, if component (B) is added at an early stage or before the rate of polymerization reaches 20%, the gel component is formed much, resulting in increased fisheyes and molded parts with increased compression set. If component (B) is added at a later stage or after the rate of polymerization exceeds 60%, the gel component is formed little, failing to improve workability and the matting effect on molded part appearance.

The monomeric charge may consist of monomeric vinyl chloride. Alternatively the monomeric charge is a mixture of monomeric vinyl chloride and at least one vinyl monomer copolymerizable therewith. The mixture generally contains more than 50% by weight of monomeric vinyl chloride. Examples of the vinyl comonomer used herein include vinyl esters such as vinyl acetate and vinyl propionate; acrylates and methacrylates such as methyl (meth)acrylate and ethyl (meth)acrylate; olefins such as ethylene and propylene; maleic anhydride; acrylonitrile; styrene; vinylidene chloride; and other monomers copolymerizable with vinyl chloride. One or more of these comonomers may be used in combination with vinyl chloride.

The suspension polymerization process of a monomeric charge in the presence of components (A) and (B) is not critical. Any conventional suspension polymerization technique may be employed while a dispersing aid and a polymerization initiator commonly used in suspension polymerization of vinyl chloride monomers may be added in conventional amounts.

Dispersing aids are often used in helping disperse the monomers in an aqueous medium. They may be conventional ones, for example, water-soluble cellulose ethers such as methyl cellulose, hydroxyethyl cellulose, hydroxypropyl cellulose, and hydroxypropylmethyl cellulose; water-soluble partially saponified polyvinyl alcohols; oil-soluble partially saponified polyvinyl alcohols; acrylic acid polymers; water-soluble polymers such as gelatin; oil-soluble emulsifiers such as sorbitan monolaurate, sorbitan trioleate, glycerin tristearate, and ethylene oxide/propylene oxide block copolymers; water-soluble emulsifiers such as polyoxyethylene sorbitan monolaurate, polyoxyethylene glycerin oleate, and sodium laurate, alone or in admixture of two or more. The dispersing aids are preferably used in amounts of about 0,001 to 0.5 part by weight per 100 parts by weight of the monomeric charge.

To the monomeric charge is also added a polymerization initiator, which may be selected from conventional ones used for the polymerization of vinyl chloride systems. Exemplary are percarbonates such as diisopropylperoxydicarbonate, di-2-ethylhexylperoxydicarbonate, and diethoxyethylperoxydicarbonate; peresters such as t-butylperoxypivalate, t-hexylperoxypivalate, t-butylperoxyneodecanate, and α-cumylperoxyneodecanate; peroxides such as acetylcyclohexylsulfonylperoxide, 2,4,4-trimethylpentyl-2-peroxyphenoxyacetate, and 3,5,5-trimethylhexanoylperoxide; and azo compounds such as azobis-2,4-dimethylvaleronitrile and azobis(4-methoxy-2,4-dimethylvaleronitrile); potassium persulfate, ammonium persulfate and hydrogen peroxide, alone or in admixture of two or more. The polymerization initiators are preferably used in amounts of about 0.01 to 0.5 part by weight per 100 parts by weight of the monomeric charge.

In the process of the invention, any of ingredients commonly used in vinyl chloride systems for polymerization, for example, polymerization control agents, chain transfer agents, antioxidants, pH adjusting agents, gelation enhancers, antistatic agents, and anti-scaling agents may be added at an appropriate stage.

Other conditions under which polymerization is carried out may be the same as in conventional processes. For example, the manner of charging the reactor with an aqueous medium, vinyl chloride monomer, and optionally a comonomer, dispensing aid, and polymerization initiator may be conventional as well as polymerization conditions such as charging proportions of the reactants. The polymerization temperature may be in the range of 35° to 80° C. as used for conventional vinyl chloride systems. Particularly when polymerization is effected at a temperature of 35° to 55° C., a matte VC-DAP copolymer whose THF-soluble component has a degree of polymerization of at least 2,000 can be advantageously produced.

The matte vinyl chloride polymer obtained by the process of the invention should consist essentially of 0.5 to 2.5% by weight, preferably 0.8 to 2% by weight of a THF insoluble gel component and the remainder of a THF-soluble component. With a THF-insoluble gel content of less than 0.5%, workability and the matting effect of molded part appearance are insufficient. With a THF-insoluble gel content of more than 2.5%, fish-eyes are increased, the matting effect of molded part appearance is less uniform, and molded parts have increased compression set.

According to a second aspect, the invention provides a process for preparing a flexible matte vinyl chloride polymer composition comprising the step of mixing 100 parts by weight of the matte VC-DAP copolymer obtained by the process of the first aspect with 50 to 150 parts by weight of a plasticizer. Less than 50 parts of the plasticizer is insufficient for plasticining purposes, resulting in molded parts having higher strength. More than 150 parts of the plasticizer would detract from physical properties such as tear strength and tensile strength and not be retained within compositions so that the plasticizer might bleed out of molded parts.

Examples of the plasticizer used herein include phthalates such as di-n-butyl phthalate, di-n-octyl phthalate, di-2-ethylhexyl phthalate, diisooctyl phthalate, diisononyl phthalate, n-octyl phthalate, n-decyl phthalate, di-n-decyl phthalate, diisodecyl phthalate, di-n-dodecyl phthalate; aliphatic dibasic acid esters such as di-2-ethylhexyl adipate, di-n-decyl adipate, diisodecyl adipate, dibutyl sebacate, and di-2-ethylhexyl sebacate; phosphates such as tributyl phosphate and tri-2-ethylhexyl phosphate; epoxy plasticizers such as epoxidized soybean oil; trimellitates such as trioctyl trimellitate.

The process of preparing a composition according to the invention may include the step of blending a thermal stabilizer. Exemplary thermal stabilizers are metal soaps such as calcium stearate, barium stearate and barium lauryl sulfate; organic tin stabilizers such as dibutyltin maleate; and lead compounds such as tribasic lead sulfate. The amount of the thermal stabilizer blended is about 1 to 5 parts by weight per 100 parts by weight of the copolymer.

In the process of preparing a composition according to the invention, there may be blended other thermoplastic resins, fillers, pigments, processing aids, and lubricants if desired. Examples of the other thermoplastic resin used herein include common vinyl chloride resins, ethylene-vinyl acetate copolymers, ABS resins, AS resins, NBR resins, crosslinked NBR resins, MBS resins, and CR resins. Examples of the filler used herein include carbon black, calcium carbonate, titanium oxide, talc, and silica. Examples of the pigment used herein include carbon black, chrome yellow, and titanium oxide. Examples of the processing aid used herein include poly(methyl methacrylate) resins. Examples of the lubricant used herein include polyethylene wax, fluid paraffin, fatty acid amides, polyhydric alcohol esters of fatty acids, and fatty acid polyglycol esters.

The copolymer may be blended with these ingredients by any of mixing techniques commonly used in blending of conventional vinyl chloride resins. There may be used a ribbon blender, Henschel mixer, tumbler or Banbury mixer. The resulting mixture may be directly subject to molding as a powder compound or comminuted by a pelletizer into a pellet compound.

The thus obtained composition may be molded by any conventional molding technique for vinyl chloride resins, for example, extrusion molding and injection molding.

It is noted that the process of preparing a composition according to the invention favors the use of a VC-DAP copolymer in which a major VC-DAP copolymer constituting a THF-soluble component has an average degree of polymerization of at least 2,000, that is, a matte VC-DAP copolymer whose THF-insoluble gel component occupies 0.5 to 2.5% by weight (especially 0.8 to 2% by weight) and whose THF-soluble resin component has an average degree of polymerization of at least 2,000. Using a matte VC-DAP copolymer whose THF-soluble component has an average degree of polymerization of at least 2,000, there can be molded a part having rubbery elasticity and satisfactory compression set.

The flexible matte VC-DAP copolymer composition thus obtained is useful in applications as hoses, tubes, packings, gaskets, wire coatings or the like.

EXAMPLE

Examples of the present invention are given below by way of illustration and not by way of limitation.

In the following Examples, a THF-insoluble gel content, an average degree of polymerization, fish-eyes, and the outer appearance of extrusion molded part were determined as follows.

THF-insoluable gel content

A vinyl chloride polymer, 1 gram, was added to 100 ml of tetrahydrofuran (THF) which was thoroughly mixed by agitation while heating at 60° C. After agitation and heating were interrupted, the solution was allowed to stand for 24 hours. A 10-ml portion of the supernatant was sampled and evaporated to dryness. The amount of the polymer residue was weighed (in gram). Using this value, a THF-insoluble gel content was calculated according to the following equation.

THF-insoluble gel content (wt%)=100−[{polymer residue amount (g)×10}/1 (g)]×100

Average degree of polymerization

A vinyl chloride polymer, 5 grams, was added to 500 ml of tetrahydrofuran (THF) which was thoroughly mixed by agitation while heating at 60° C. After agitation and heating were interrupted, the solution was allowed to stand for 24 hours. A 200-ml portion of the supernatant was sampled and evaporated to dryness, collecting a THF-soluble vinyl chloride polymer. The vinyl chloride polymer was measured for an average degree of polymerization according to JIS K-6721.

Fisheyes blend of the following ingredients was prepared.

|  | Parts by weight |
|---|---|
| Vinyl chloride polymer | 100 |
| Trioctyl trimellitate | 80 |
| Epoxidized soybean oil | 5 |
| Ba—Zn composite stabilizer | 2 |
| Carbon black | 0.1 |

The blend, 50 g, was milled by a 6-inch roll mill at 150° C. for 5 minutes, obtaining a sheet of 15 cm wide and 0.3 mm thick. The number of fisheyes (transparent particles) in a 100-cm$^2$ area of the sheet was counted.

Outer appearance of extrusion molded part

In a 20-liter Henschel mixer, the following ingredients were admitted and mixed until the contents reached 110° C.

|  | Parts by weight |
|---|---|
| Vinyl chloride polymer | 100 |
| Trioctyl trimellitate | 80 |
| Epoxidized soybean oil | 2 |
| Ba—Zn composite stabilizer | 2 |
| Calcium carbonate | 20 |
| Carbon black | 0.1 |

The mixture was allowed to cool below 50° C., obtaining a compound. Using a 20-mm diameter extruder, the compound was extruded into a sheet under the following conditions.

Screw: L/D=22, CR=2.3, 40 rpm

Die: T-die, orifice 40 mm wide×1.0 mm thick

Set temperature:
cylinder C1=150° C.
cylinder C2=170° C.
cylinder C3=190° C.
die D=195° C.

The sheet was visually observed for outer appearance or surface state.

Example 1

A stainless steel kettle having an internal volume of 2.1 m$^3$ was charged with an aqueous solution of 600 g of a partially saponified polyvinyl alcohol having a degree of saponification of 73% and an average degree of polymerization of 800 in 1,000 kg of deionized water, and further with 180 g of a partially saponified polyvinyl alcohol having a degree of saponification of 40% and an average degree of polymerization of 350 and 1,020 g of diallyl phthalate (DAP). The kettle was evacuated to 50 mmHg and charged with 600 kg of vinyl chloride monomer. With stirring, 720 g of t-butylperoxyneodecanate was pumped into the kettle and the contents were simultaneously heated to start polymerization. Polymerization reaction was carried out while maintaining the polymerization temperature at 47° C. At the time when the rate of polymerization reached 40%, 300 g of 1,6-hexanediol diacrylate was pumped into the kettle. Reaction was continued while monitoring the internal pressure. At the time when the internal pressure reached 5.0 kg/cm$^2$G, polymerization was terminated and the unreacted monomer was recovered. The resulting slurry was taken out of the kettle and dewatered and dried, obtaining a polymer.

Example 2 polymerization was effected by the same process as in Example 1 except that the amount of DAP used was 600 g, the amount of 1,6-hexanediol diacrylate was 180 g, the polymerization temperature was 40° C. and polymerization was terminated at an internal pressure of 4.0 kg/cm$^2$G, obtaining polymer.

Comparative Example 1

Polymerization was effected by the same process as in Example 1 except that 1,6-hexanediol diacrylate was omitted, obtaining a polymer.

Comparative Example 2

Polymerization was effected by the same process as in Example 1 except that the amount of 1,6-hexanediol diacrylate used was 1,200 g, obtaining a polymer.

Comparative Example 3

Polymerization was effected by the same process as in Example 1 except that 1,6-hexanediol diacrylate was admitted when the rate of polymerization reached 10%, obtaining a polymer.

Comparative Example 4 polymerization was effected by the same process as in Example 1 except that 1,6-hexanediol diacrylate was admitted when the rate of polymerization reached 70%, obtaining a polymer.

Comparative Example 5

Polymerization was effected by the same process as in Example 1 except that 120 g of diallyl maleate was used instead of 1,6-hexanediol diacrylate, obtaining a polymer.

The polymers obtained in these examples were examined for the above-mentioned factors, with the results shown in Table 1.

TABLE 1

|  | Polymerizing temp. (°C.) | Amount of DAP used (g) | Component (B) Type | Component (B) Addition Amount (g) | Component (B) Stage | Average degree of polymerization | THF-insoluble gel (%) | Fisheye | Matting appearance of molded part Effect | Matting appearance of molded part Uniformity |
|---|---|---|---|---|---|---|---|---|---|---|
| E1 | 47 | 1020 | HdOdA | 300 | 40% | 3300 | 1.0 | 4 | good | fine texture, good |
| E2 | 40 | 600 | HdOdA | 180 | 40% | 3770 | 1.2 | 6 | good | fine texture, good |
| CE1 | 47 | 1020 | — | — | — | 3310 | 0 | 3 | poor, surface luster | partially uneven, poor |
| CE2 | 47 | 1020 | HdOdA | 1200 | 40% | 3280 | 4.8 | 52 | good | rough texture, |

TABLE 1-continued

|     | Polymerizing temp. (°C.) | Amount of DAP used (g) | Component (B) Type | Component (B) Addition Amount (g) | Component (B) Addition Stage | Average degree of polymerization | THF-insoluble gel (%) | Fisheye | Matting appearance of molded part Effect | Matting appearance of molded part Uniformity |
|-----|---|---|---|---|---|---|---|---|---|---|
| CE3 | 47 | 1020 | HdOdA | 300 | 10% | 3270 | 5.0 | 79 | good | poor rough texture, poor |
| CE4 | 47 | 1020 | HdOdA | 300 | 70% | 3290 | 0.3 | 4 | poor, surface luster | partially uneven, poor |
| CE5 | 47 | 1020 | diallyl maleate | 120 | 40% | 3390 | 6.7 | 110 | good | rough texture, poor |

\* HdOdA = 1,6-hexanediol diacrylate
Addition stage of component (B) is expressed in terms of a rate of polymerization (%).

Examples 3 and 4

Polymerization was effected again by the same process as in Example 1 to examine whether the process was reproducible.

Comparative Examples 6 and 7

Polymerization was effected again by the same process as in Comparative Example 5 to examine whether the process was reproducible.

Comparative Example 8

A stainless steel kettle having an internal volume of 2.1 m$^3$ was charged with an aqueous solution of 600 g of a partially saponified polyvinyl alcohol having a degree of saponification of 73% and an average degree of polymerization of 800 in 1,000 kg of deionized water, and. further with 180 g of a partially saponified polyvinyl alcohol having a degree of saponification of 40% and an average degree of polymerization of 350 and 1,440 g of diallyl phthalate (DAP). The kettle was evacuated to 50 mmHg and charged with 600 kg of vinyl chloride monomer. With stirring, 720 g of t-butylperoxyneodecanate was pumped into the kettle and the contents were simultaneously heated to start polymerization. Polymerization reaction was carried out while maintaining the polymerization temperature at 52° C. At the time when the internal pressure reached 6.0 kg/cm$^2$G, polymerization was terminated and the unreacted monomer was recovered. The resulting slurry was taken out of the kettle and dewatered and dried, obtaining a polymer.

Comparative Examples 9 and 10

Polymerization was effected again by the same process as in Comparative Example 8 to examine whether the process was reproducible.

The polymers obtained in the foregoing examples were examined for the above-mentioned factors, with the results shown in Table 2.

TABLE 2

|      | Polymerizing temp. (°C.) | Amount of DAP used (g) | Component (B) Type | Component (B) Addition Amount (g) | Component (B) Addition Stage | Average degree of polymerization | THF-insoluble gel (%) | Fisheye | Matting appearance of molded part Effect | Matting appearance of molded part Uniformity |
|------|---|---|---|---|---|---|---|---|---|---|
| E1   | 47 | 1020 | HdOdA | 300 | 40% | 3300 | 1.0 | 4 | good | fine texture, good |
| E3   | 47 | 1020 | HdOdA | 300 | 40% | 3340 | 1.3 | 3 | good | fine texture, good |
| E4   | 47 | 1020 | HdOdA | 300 | 40% | 3310 | 1.1 | 6 | good | fine texture, good |
| CE5  | 47 | 1020 | diallyl maleate | 120 | 40% | 3390 | 6.7 | 110 | good | rough texture, poor |
| CE6  | 47 | 1020 | diallyl maleate | 120 | 40% | 2910 | 0.6 | 12 | good | fine texture, good |
| CE7  | 47 | 1020 | diallyl maleate | 120 | 40% | 3420 | 8.2 | 219 | good | rough texture, poor |
| CE8  | 52 | 1440 | — | — | — | 3360 | 1.1 | 3 | good | fine texture, good |
| CE9  | 52 | 1440 | — | — | — | 4270 | 8.3 | 341 | good | rough texture, poor |
| CE10 | 52 | 1440 | — | — | — | 2710 | 0 | 5 | poor, surface luster | partially uneven, poor |

\* HdOdA = 1,6-hexanediol diacrylate
Addition stage of component (B) is expressed in terms of a rate of polymerization (%).

Examples 5–6 and Comparative Examples 11–12

Each of the vinyl chloride polymers obtained in Examples 1 and 2 and Comparative Examples 1 and 2, 100 parts by weight, was admitted into a 20-liter Henschel mixer along with 82 parts by weight of a plasticizer (diisononyl phthalate), 4 parts by weight of a Ba-Zn composite stabilizer, 20 parts by weight of calcium carbonate, 1 part by weight of polyethylene wax, 2 parts by weight of polymethyl methacrylate processing aid, and 1 part by weight of carbon black. The ingredients were mixed until the contents reached 110° C. The mixture was cooled below 50° C., obtaining a compound.

The thus obtained compounds were examined for roll wrapping time and compression set by the following tests.

Roll wrapping time

The compound was milled in a mill of two 6-inch rolls separated a gap of 1.0 mm at a temperature of 150° C. The time taken from the admission of the compound until it was wrapped around the rolls in sheet form was measured.

Compression set

After the compound was wrapped in sheet form in the roll wrapping test, it was roll milled for a further 10 minutes to form a sheet of 2.0 mm thick. The sheet was cut into a specimen. The specimen was heat pressed before it was measured for compression set by compressing it at a temperature of 70±° C. for 22 hours according to JIS K-6301.

TABLE 3

|  | Example | | Comparative Example | |
|---|---|---|---|---|
|  | 5 | 6 | 11 | 12 |
| Vinyl chloride polymer | | | | |
| Average degree of polymerization | 3300 | 3770 | 3310 | 3280 |
| THF-insoluble gel content | 1.0% | 1.2% | 0.0% | 4.8% |
| Origin | E1 | E2 | CE1 | CE2 |
| Roll wrapping time, min. | 7 | 7 | 11 | 6 |
| Compression set, % | 53 | 52 | 52 | 55 |

There has been described a process capable of preparing in a reproducible manner a vinyl chloride resin, more specifically a vinyl chloride-diallyl phthalate copolymer with a THF-insoluble gel content of 0.5 to 2.5% by weight featuring minimized fisheyes and improved matting effect.

Japanese Patent Application No. 304281/1994 is incorporated herein by reference.

While the invention has been described in connection with what is presently considered to be the most practical and preferred embodiment, it will be understood that the invention is not to be limited to the disclosed embodiment, but on the contrary, is intended to cover various modifications and equivalent changes included within the spirit and scope of the appended claims.

We claim:

1. A process for preparing a matte vinyl chloride polymer by suspension polymerizing a monomeric charge comprising monomeric vinyl chloride in an aqueous medium, said process comprising the steps of starting the polymerization in the presence of diallyl phthalate in an amount of 0.1 to 0.2 part by weight per 100 parts by weight of the monomeric charge, and continuing polymerization while adding 1,6-hexanediol diacrylate or 1,6-hexanediol dimethacrylate in an amount of 0.03 to 0.1 part by weight per 100 parts by weight of the monomeric charge when the conversion rate of the polymerization is in the range of 30 to 50%, the polymerization being effected at a temperature of 35° to 55° C., thereby forming a matte vinyl chloride comprising a tetrahydrofuransoluble component and a tetrahydrofuran-insoluble gel component, said tetrahydrofuran-soluble component having a degree of polymerization of at least 2,000 and the content of said tetrahydrofuran-insoluble gel component being 0.5 to 2.5% by weight.

2. The process of claim 1 wherein said monomeric charge consists of a vinyl chloride monomer.

3. The process of claim 1 wherein said monomeric charge is a mixture of a vinyl chloride monomer and at least one vinyl monomer other than a vinyl chloride monomer.

4. A process for preparing a flexible matte vinyl chloride polymer composition comprising the step of mixing 100 parts by weight of the matte vinyl chloride polymer obtained by the process of claim 1 with 50 to 150 parts by weight of a plasticizer.

* * * * *